Aug. 9, 1927.
G. E. WEAVER
1,638,790
TRUCK JACK
Filed Aug. 22, 1925
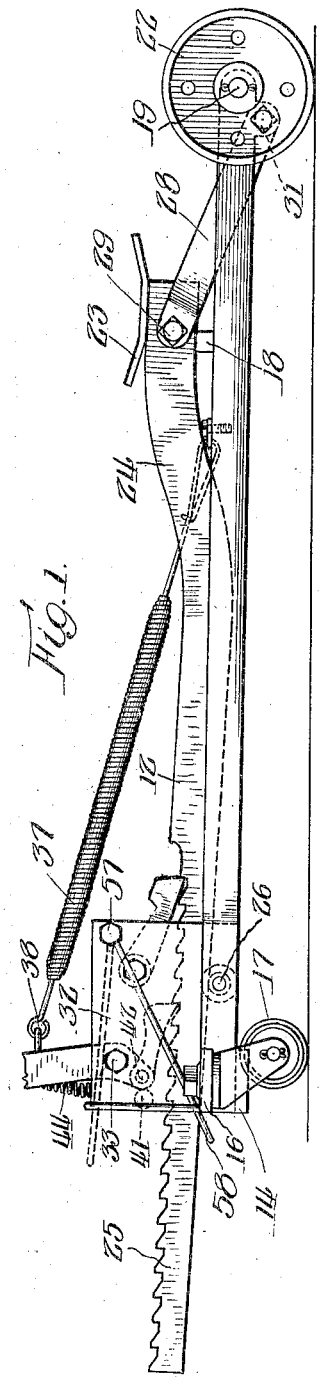
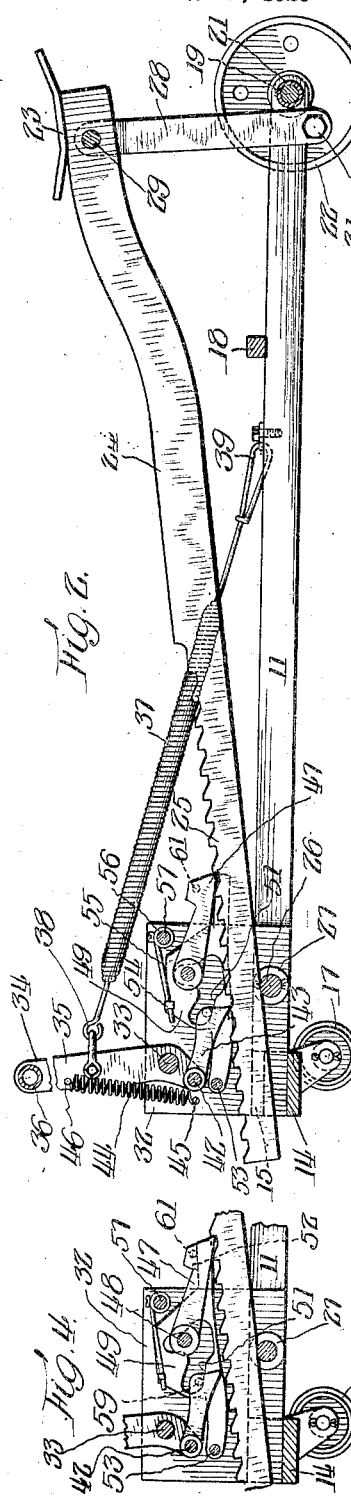
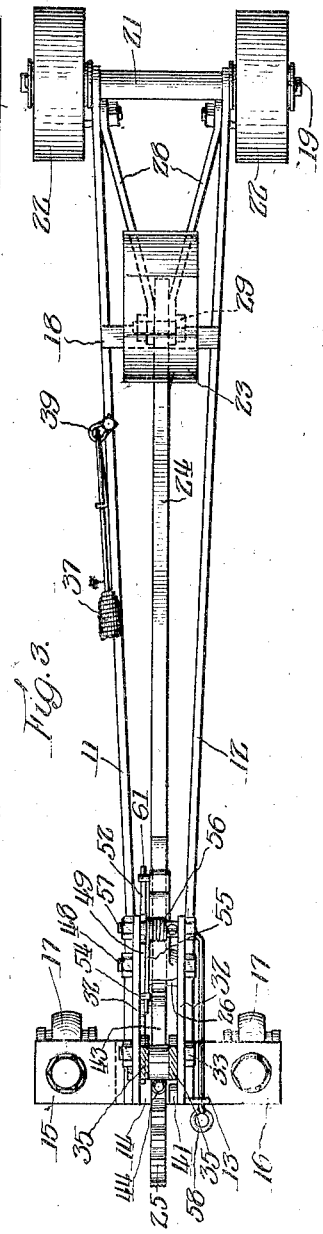
Inventor:
Gailard E. Weaver
By Walter M. Fuller
Atty.

Patented Aug. 9, 1927.

1,638,790

UNITED STATES PATENT OFFICE.

GAILARD E. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

TRUCK JACK.

Application filed August 22, 1925. Serial No. 51,767.

My invention concerns jacks of the wheel truck type and aims to provide an appliance of this general character which, while simple in structure and composed of relatively few parts, and hence adapted to be constructed economically and at low cost, is effective in operation to raise a load from a comparatively low position to a relatively high one, thus enabling such a truck-jack to be used readily and satisfactorily for lifting the axles of automobiles equipped with balloon tires, so-called, when one or more of them is deflated, whereby to replace the tire with another or to repair the damaged tire or its tube.

To enable those skilled in this art to have a full and complete understanding of the invention both from structural and functional standpoints, in the accompanying drawing, forming a part of this specification, and throughout the several views of which like reference characters have been used to designate the same parts, I have illustrated a present desirable and preferred embodiment of the invention.

In this drawing:

Figure 1 is a fragmentary side elevation of the new truck-jack showing the load saddle in lowered position;

Figure 2 is a lengthwise section thereof indicating the parts when the saddle is in elevated position;

Figure 3 is a top plan view of the appliance with the operating handle broken away; and Figure 4 is a detail section of the pawl or dog mechanism for operating the ratchet-bar.

By reference to the drawing, it will be noted that the novel and improved structure includes a main, horizontal frame composed of a pair of slightly forwardly-diverging side-bars 11 and 12 connected together at their rear ends by a cross-bar 13 having a central, depressed section 14 and oppositely-projecting or outstanding portions 15 and 16, each equipped underneath with a suitably-mounting castor-wheel 17.

These side-bars 11 and 12 are also joined together by a cross-bar 18 welded or otherwise appropriately secured to their top edges.

At their front ends, these companion bars are apertured in register for the reception of a cross-axle 19 supplied with a spacing sleeve or collar 21 between the bars and fitted with a pair of carrying-wheels 22 just outside of the bars and freely revoluble on the axle.

The appliance has an appropriately-shaped seat or saddle 23 designed and adapted to be positioned beneath the load, such as an automobile axle, and to raise and lower it as occasion requires.

Such saddle, in the present instance, is rigidly mounted on the top of the front end of a bent ratchet-bar 24 equipped on its top edge for a portion of its length with a series of ratchet-teeth 25, such bar resting and slidable bodily on a cross-rod or shaft 26 received in holes in the frame side-bars and supplied with spacing collars 27 between the opposite faces of the teeth-equipped ratchet-bar and the inner faces of the frame side-bars, thus assuring that the movable bar will always be maintained centrally of the frame.

Beneath the load-engaging saddle 23, two links 28, 28 are pivoted or hinged at 29 to the ratchet-bar on opposite sides of the latter, the lower ends of such links being hinged at 31, 31 to depending ears on the corresponding side-bars of the frame.

Obviously, as the ratchet-bar is shifted or moved forwardly or rearwardly, the saddle 23 will ascend or descend, as the case may be, in a curved path determined by the associated links which support the saddle and its load from below.

Secured against the rear end portions of the inner faces of the frame side-bars are a pair of spaced upstanding plates 32, 32 which support a cross shaft or rod 33 on which, between the plates, is fulcrumed the lower end portion of a bell-crank operating-handle 34 composed of a pair of spaced bars 35, 35 supplied at their upper ends with a cross-rod or handle 36 adapted to be grasped by the operator.

Such oscillatory handle 34, rockable in a vertical plane, is normally spring-pulled upwardly to substantially vertical position by a coiled, contractile spring 37 fastened to the handle at 38 and to the frame-bar 11 at 39, the upward rocking movement of the handle being limited by an abutment 41 mounted on the inner side of one of the plates 32.

Between the lower, short, spaced arms of the bell-crank operating-handle, on a shaft 42 carried by and between such arms, a dog or pawl 43 is fulcrumed, its tooth adapted to cooperate with the teeth or shoulders of the ratchet-bar being pressed down into operative position by a short, coiled spring 44 connected at one end at 45 to a tail of the dog 43 and at its other end to a cross-pin 46 carried by and between the handle-bars 35, 35.

A correlated holding or locking pawl or dog 47 is fulcrumed at 48 between the plates 32, 32 on a cross-pin carried by the latter, such pawl being held down to its work by its own weight, although a spring may also be employed in connection with this pawl if desired.

In order to permit lowering of the saddle and its load step by step by manipulation of the operating-handle, a cam-plate 49, having the cam surfaces 51 and 52, is fulcrumed or hinged at 53 on one of the vertical side-plates 32, and, in order that such cam-element may be shifted to perform its functions, it has a lateral lug 54 through which extends an outstanding end 55 of a spring 56 coiled around and having its other end fastened to a shaft 57 rockingly mounted in the side-plates 32, 32 with its protruding end fitted with an actuating handle 58 which may be swung down or up as needed.

To permit the cam member to be operatively associated with the two pawls or dogs, the one pawl 43 has an outstanding pin 59 overlying the cam surface 51 and the companion pawl has a similar lateral lug 61 extending or projecting over the other cam surface 52, as is perhaps most clearly shown in Figure 4.

Assuming that the parts of the mechanism are in the positions or relations indicated in Figure 1, with the saddle or seat in lowered position and with the handle 58 down, and that it is desired to raise the axle of an automobile, the operator moves or rolls the truck-jack around by the handle 34 until the saddle is introduced properly and directly beneath the axle.

Then by pressing forwardly with his foot on the end of the ratchet-bar, the latter is shifted forwardly and upwardly simultaneously easily and quickly until the seat or saddle encounters the load or axle.

Thereupon, the operator pumps or rocks the handle 34 up and down effecting the load-elevating action.

Every time that the handle is rocked downwardly, the dog 43 travels forwardly while in contact with one of the teeth or shoulders of the ratchet-bar and forces the latter in the same direction, hence raising the axle a corresponding amount.

The ratchet-bar is held in its advanced position by the locking dog or pawl 47 in the usual manner during the retraction of the operating-pawl 43; by the upward swinging of the handle, for coaction with another ratchet-tooth.

A continuation or repetition of these movements raises the load step by step as will be readily understood, but it is to be observed, that the construction has to be such that the two pawls will properly cooperate with the series of ratchet-teeth even though the ratchet-bar slides lengthwise on its supporting cross-shaft 26 and also rocks thereon by reason of the progressive elevation of its saddle-equipped end due to the swinging movement of the associated links 28.

In order to lower the saddle and its load, the operator rocks the arm or handle 58 upwardly to the dotted line position indicated in Figure 1 which swings the cam-plate 49 upwardly so that the pins or lugs of the two pawls will coact with their respective cam surfaces, which are of such shape and form that the saddle may be caused to descend step by step in a manner well understood.

That is to say, when the operating handle is rocked down, the pawl 43 lifts the load slightly and the locking or holding dog being thus relieved of the load swings up out of the way under the lifting action of the spring 56 which is transmitted to the pawl through the cam surface 52 and the companion lug 61.

Then the operating-pawl 43 in retracting allows the load to descend a small amount and when such pawl approaches the limit of its backward travel its pin 59 by engagement with the cam surface 51 rocks the cam-plate down causing the holding pawl to descend and encounter a tooth of the ratchet-bar to sustain the load during the next advance movement of the pawl 43, the first portion of whose forward travel is idle by reason of the engagement of pin 59 with the cam surface 51.

A repetition of these actions causes the load and saddle to descend step by step.

Thus it will be understood that while the saddle may be raised and lowered by intermittent movements it also has a rocking action by reason of its turning around the center 21, all as has been fully depicted in Figures 1 and 2.

The structure as a whole is simple in construction, it is composed of few parts, it may be manufactured at comparatively low cost, and the appliance is effective and satisfactory in operation.

Those trained in this art will readily understand that the invention is not limited to the precise and exact details of structure shown and described and that these may be modified within comparatively wide limits without departure from the heart and essence of the invention and without the sacrifice of any of its material benefits and advantages, the scope of the invention being defined by the appended claim.

I claim:

In a truck-jack, the combination of a truck-frame, carrying-wheels therefor, a ratchet-bar, a load-engaging saddle mounted on said ratchet-bar near one end thereof, a link connecting said ratchet-bar near said saddle to said truck-frame, a bearing for the other end portion of said ratchet-bar permitting lengthwise sliding movement of the latter, an operating-handle fulcrumed on said truck-frame, an operating pawl associated with said handle adapted to coact with the teeth of said ratchet-bar, a holding-pawl cooperating with said ratchet-bar teeth, and means connecting said pawls permitting the descent of the saddle, whereby the load may be lifted and lowered step by step by actuation of said operating-handle, said ratchet-bar in the lowest position of said saddle being in a convenient position for movement by the foot of the operator to cause said saddle to rise and engage the load.

In witness whereof I have hereunto set my hand.

GAILARD E. WEAVER.